United States Patent

[11] 3,557,657

[72] Inventor Bror W. Swanson
 81 Rumford St., West Hartford, Conn. 06607
[21] Appl. No. 772,699
[22] Filed Nov. 1, 1968
[45] Patented Jan. 26, 1971

[54] THREAD-MILLING MACHINE
 8 Claims, 4 Drawing Figs.
[52] U.S. Cl. .................................................. 90/11.54,
 90/21; 10/105
[51] Int. Cl. ..................................................... B23g 1/32
[50] Field of Search ........................................... 90/11.54,
 11.5, 11.4, 21; 10/105

[56] References Cited
 UNITED STATES PATENTS
 54,096  4/1866  Bee ............................ 90/11.54

| 1,155,432 | 10/1915 | Muller | 90/11.54 |
| 1,343,503 | 6/1920 | Hall | 90/11.54 |
| 1,863,570 | 6/1932 | Lees | 90/11.54 |
| 3,023,546 | 3/1962 | Beck | 90/11.54 |

Primary Examiner—Gil Weidenfeld
Attorney—Berman, Davidson & Berman

ABSTRACT: A thread milling machine comprising: a base; a work head and a cutter head mounted on said base, each of said heads having means to rotate, respectively, a workpiece and a cutter on parallel axes; means on said cutter head for advancing the work piece axially; and means on said work head for periodically reciprocating the work transversely of its axis of rotation.

INVENTOR.
BROR W. SWANSON,
BY Berman, Davidson & Berman
ATTORNEYS.

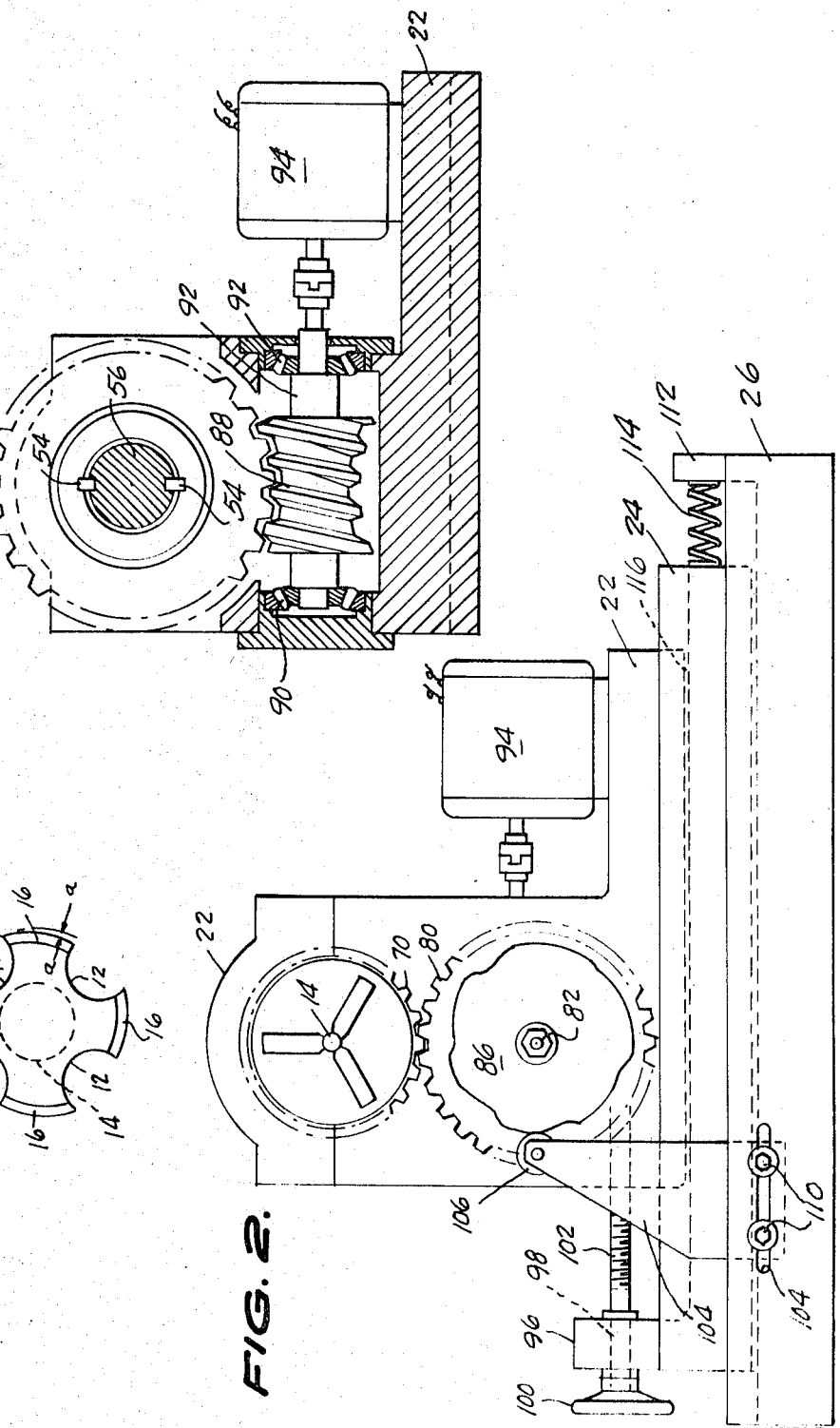

THREAD-MILLING MACHINE

It is a primary object of this invention to provide a machine for milling the cutting edges on thread-cutting taps and dies from initially fluted blanks. Such a machine is also well adapted to make certain precision aircraft parts.

It is a further object of this invention to provide a machine as aforesaid which will be fully automatic in operation and which may be quickly and easily adapted for the production of taps or dies of any selected pitch or diameter.

It is a further object of this invention to provide a machine as aforesaid which will complete its milling operation with a minimum number of rotations of the workpiece.

The above and other objects will be made clear from the following detailed description taken in connection with the annexed drawings, in which:

FIG. 2 is an elevation taken on the line 2—2 of FIG. 1;

FIG. 3 is a section on the line 3—3 of FIG. 1; and

FIG. 4 is an end elevation of a typical tap tooth formed on this machine.

Figure 1:
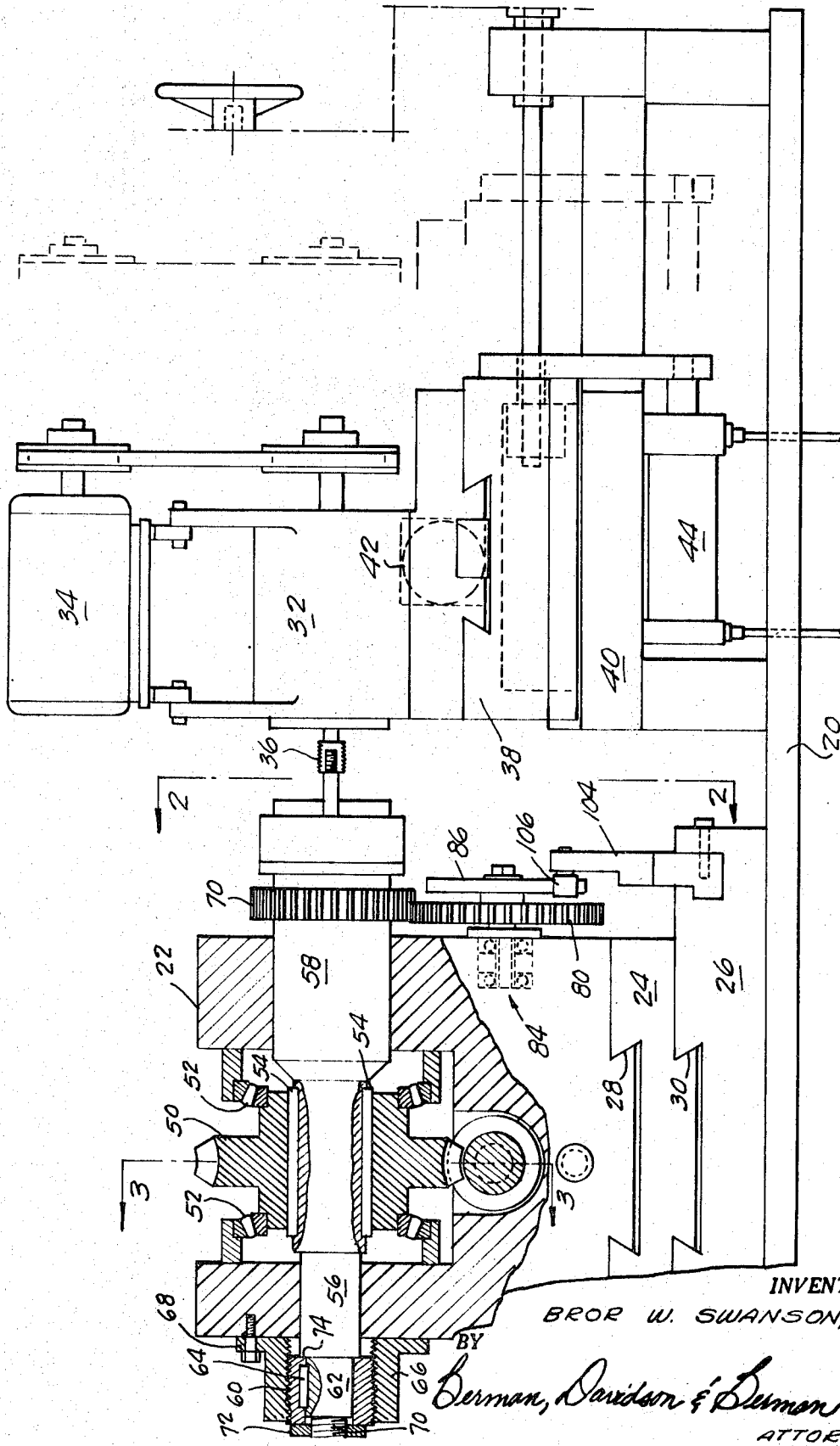
FIG. 1 is a front elevation partly in section showing the machine as a whole.

In order fully to understand the operation and functioning of this machine, reference should be made to FIG. 4. The machine is presented with a workpiece in the form of the dotted circle 10 in which have been formed flutes 12 which usually will be axially straight but for some purposes may be formed as a spiral. The shank portion is indicated by the dotted line 14. The blank on which the machine will operate therefore consists of a cylindrical portion corresponding to the circle 10 and grooved as shown at 12 connected to a shank portion 14 of lesser diameter. Details of the shank, of course, are dictated by the machine in which the tap is to be used and therefore concern this invention not at all.

The edges 16 are cut so as to present in cross section having a profile of the female thread to be formed by the tap. The edges 16 must include relief to the rear of the front cutting edges 18, as indicated by the arrows a—a in FIG. 4. All of this is conventional tap design but it will clearly be seen that the problem of milling the tap to produce the teeth shown in FIG. 4 is by no means a simple problem.

Referring now to FIG. 1, the machine as a whole is mounted on a base 20. The work head 22 is slidably mounted on an intermediate base 24 which in turn is slidably mounted on a subbase 26. The head 22 slides on the intermediate base 24 and is guided by conventional dove-tailed guides 28. Similar guides are provided between the intermediate base 24 and the subbase 26 and are designated 30.

At the right-hand side of FIG. 1 is shown a cutter head 32 having its drive motor 34 mounted on the cutter head and driving a cutter 36. The head 32 is slidable transverse the axis of the cutter 36 on a subbase 38. The subbase 38 is itself slidable parallel to the axis of the cutter 36 on a main base 40. Sliding the cutter head transverse the axis is under control of a hydraulic cylinder 42 and axial sliding of the subbase 48 is under the control of a hydraulic cylinder 44. The motor 34 has infinitely variable speed within the limits of its electronic control. Since the cutter head and its mounting and its motor constitute purely conventional design, these parts will not have further detailed description.

As seen in FIG. 1, a worm gear 50 is mounted in the work head 22 on tapered opposed roller bearings 52 which have the effect of locking the worm gear 50 against axial movement. Keys 54 form a slidable spline connection between the gear 50 and a work shaft 56 which has an enlarged end 58 with both ends having bearing in the work head 22. A gear 70 is secured to and rotatable with the enlarged end 58 for a purpose presently to be described.

The left-hand end of the work shaft 56 has a reduced portion 62 connected by a key 64 with a threaded sleeve 66. The threads on the sleeve 64 mate with threads formed on a female sleeve 66 having a flange 68 bolted or otherwise secured to the work head 22. The reduced portion 62 of the shaft 56 has a further reduced threaded end 70 which receives a locknut 72 which holds the sleeve 60 firmly against a shoulder 74 which forms the demarcation between the shaft 56 and the reduced portion 62. As a result, as the shaft 56 is rotated, the sleeve 60 advances along its threads by virtue of engagement with the female sleeve 66, thereby advancing the shaft 56 axially toward the working end. The rate of advance depends, of course, on the pitch of the threads between the sleeves 60 and 66 with a different pair of sleeves being required for each particular pitch of the work to be milled.

At the opposite end a chuck 76 is secured carrying the conventional three jaws 78 for gripping the shank 14 (FIG. 4) of a workpiece 10.

Referring now to FIGS. 1 and 2, it will be seen that the gear 70 meshes with a lower gear 80 mounted on a shaft 82 which, as indicated at 84 in FIG. 1, has bearing in the work head 22. Also secured to the shaft 82 for rotation therewith is a cam 86. The cam 86 is a very central part of this invention and will be described in detail hereinafter.

As seen in FIG. 3, the worm gear 50 meshes with a worm 88 mounted in opposed tapered bearings 90 in the base of the work head 22. This arrangement of bearings, like that of the bearings 52, locks the worm 88 against axial movement. The worm is mounted on the shaft 92 and is rotated by a motor 94 also mounted on the work head 22. The motor 94, within its range, has infinitely variable speed under electronic control. Such controls are now conventional and need not be discussed here.

A comparison of FIGS. 1 and 2 shows the work head 22 as slidable on the intermediate base 24. A lug 96 is mounted at the left-hand end of the intermediate base 24. A shaft 98 is rotatably mounted in the lug 96 and has a hand wheel 100 at one end with its opposite end threaded, as indicated at 102, with the threaded end engaging mating threads in the work head 22. This permits adjustment of the work head 22 on the intermediate base 24 in a direction transverse the axis of the chuck 76. This adjustment is necessary to take care of varying diameters of the workpiece 10 and of the cutter tool 36, the adjustment being made when the diameters of the workpiece and of the cutter are determined. As previously noted, the subslide 24 is itself slidable on the subbase 26. The subbase 26 has a bracket 104 at the free end of which a roller follower 106 is mounted to engage the cam 86. The bracket 104 is secured in an elongated slot 108 in the subbase 26 by means of bolts 110. This enables the follower 106 always properly to engage any particular cam 86.

At the right-hand end the subbase 26 there is formed an upwardly projecting lug 112. A compression spring 114 engages at one end with the lug 112 and with the intermediate base 24 within a recess 116. The spring 114 maintains contact between the follower 106 and the cam 86 so, as the cam 86 rotates, the intermediate base 24 and the cutter head 22 will reciprocate to left and right, as viewed in FIG. 2, the amount and rapidity of motion depending on the contours of the particular cam 86.

The precise contours of the cam 86 are chosen with respect to the number of teeth on the tap or die to be milled, the number of flutes in the workpiece 10, and particularly with reference to the formation of the clearance on the line a—a of FIG. 4. Cam 86 of FIGS. 1 and 2 is designed for straight axial flutes 12 formed in the workpiece 10. It can, of course, be adapted to cut tapered taps and to accommodate helical flutes.

Each particular tap or die to be milled will require a particular male threaded sleeve 60, a particular female sleeve 66 and a particular cam 86. It is to be noted that all adjustments transverse the axes of rotation are made through the work head 22, the intermediate base 24 and the subbase 26 while all axial adjustments are made by the subslide 38 supporting the cutter head 32. The transaxial motion of the cutter head 32 occasioned by the hydraulic cylinder 42 is used primarily to move the cutter head 32 out of the way between operations or during a change of cams and sleeves.

I claim:

1. A thread-milling machine comprising: a base; a work head and a cutter head mounted on said base, each of said heads having means to rotate, respectively, an axially fluted workpiece and a cutter on parallel axes; means on said work head to provide a predetermined advancement of the workpiece axially of said cutter for each rotation of said workpiece; and means on said work head for periodically reciprocating the workpiece transversely of its axis of rotation a predetermined plurality of times during each said predetermined axial advancement of the workpiece.

2. A thread-milling machine comprising: a base; a work head and a cutter head mounted on said base, each of said heads having means to rotate, respectively, a workpiece and a cutter on parallel axes; means on said work head for advancing the workpiece axially; and means on said work head for periodically reciprocating the work transversely of its axis of rotation, said machine including a subbase; an intermediate base slidable on said subbase, said intermediate base slidably supporting said work head; a cam rotatable on said work head; a follower mounted on said subbase and engaging said cam and resilient means operable between said work head and said subbase for biasing said cam and follower into mutual engagement.

3. The machine of claim 1, including a shaft in said work head, means slidably connecting said shaft and said workpiece rotating means for rotating said shaft, said shaft carrying a chuck for holding said workpiece; said axially advancing means including threaded means on said shaft; threaded means on said work head mating with said threaded means on said shaft whereby to advance said shaft, said chuck and said workpiece axially as said shaft rotates.

4. The machine of claim 3, in which the threaded means on the shaft comprises an externally threaded sleeve keyed to the shaft and the threaded means on the cutter head comprises a flanged, internally threaded sleeve, said flange being bolted to the work head.

5. The machine of claim 3, in which said cam has spaced, peripheral lobes, each lobe being profiled in accordance with the thread desired on said workpiece.

6. The machine of claim 2, including a shaft in said work head, means slidably connecting said shaft and said workpiece rotating means for rotating said shaft, said a shaft carrying a chuck for holding said workpiece; threaded means on said shaft; threaded means on said work head mating with said threaded means on said shaft whereby to advance said shaft, said chuck and said workpiece axially as said shaft rotates.

7. The machine of claim 6, in which the threaded means on the shaft comprises an externally threaded sleeve keyed to the shaft and the threaded means on the cutter head comprises a flanged, internally threaded sleeve, said flange being bolted to the work head.

8. The machine of claim 6, in which said cam has spaced, peripheral lobes, each lobe being profiled in accordance with the thread desired on said workpiece.